J. E. TABER.
AUTOMOBILE TOP.
APPLICATION FILED DEC. 21, 1914.

1,173,618.

Patented Feb. 29, 1916.
2 SHEETS—SHEET 1.

Witnesses:
Lela W. Cook.
John W. Culp.

John E. Taber.
INVENTOR.
By George J. Oltsch,
ATTORNEY.

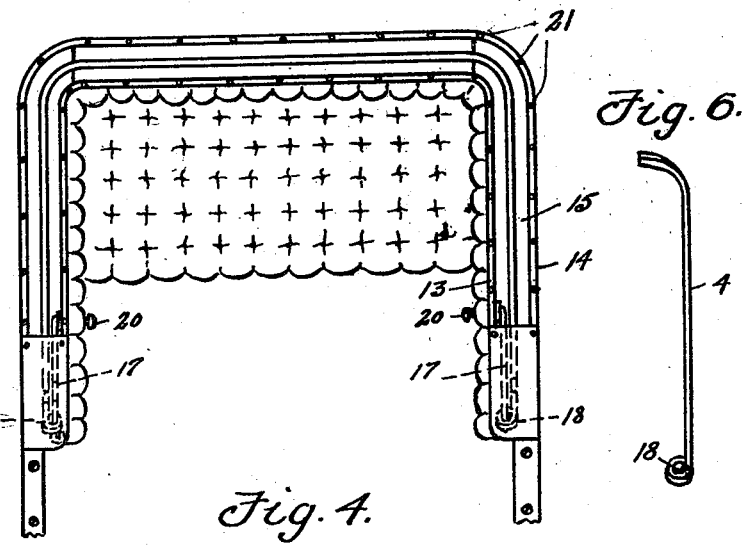
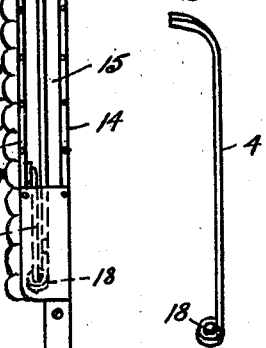
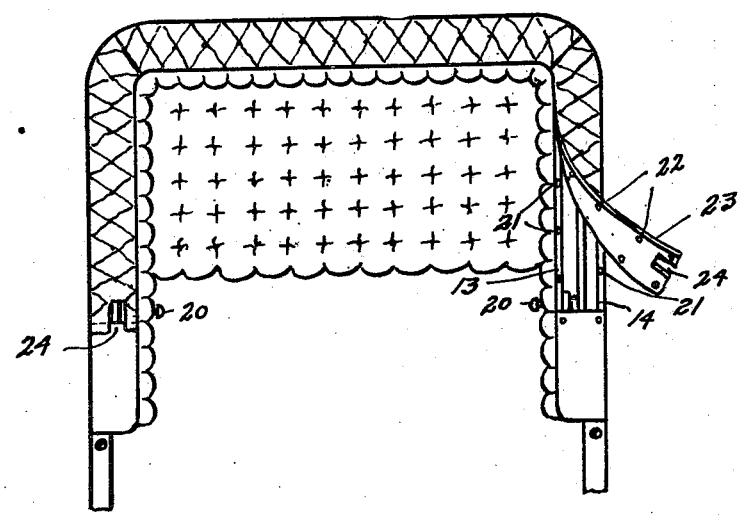

UNITED STATES PATENT OFFICE.

JOHN E. TABER, OF SOUTH BEND, INDIANA.

AUTOMOBILE-TOP.

1,173,618.  Specification of Letters Patent.  Patented Feb. 29, 1916.

Application filed December 21, 1914. Serial No. 878,272.

*To all whom it may concern:*

Be it known that I, JOHN E. TABER, a citizen of the United States, residing at South Bend, in the county of St. Joseph and State of Indiana, have invented certain new and useful Improvements in Automobile-Tops, of which the following is a specification.

The invention relates to an improvement in automobile tops and particularly to a construction whereby the top proper, which is generally of the usual design, may in folded condition disappear and be completely housed within the rear portion of the automobile, remaining at all times accessible when desired to be elevated.

The invention generally stated consists in forming the rear portion of the body so as to provide a receiving chamber practically coextensive with the rear seat, that portion of the chamber directly in rear of the seat being of less depth than the portions of the chamber at the sides of the seat, the top proper being arranged to be connected when folded into a practically unitary structure, one element of which is guided in movement into and from the chamber, so that the whole top may be disposed in the chamber, the upper edges of the chamber walls being formed to receive a removable covering to conceal all parts.

Figure 1:
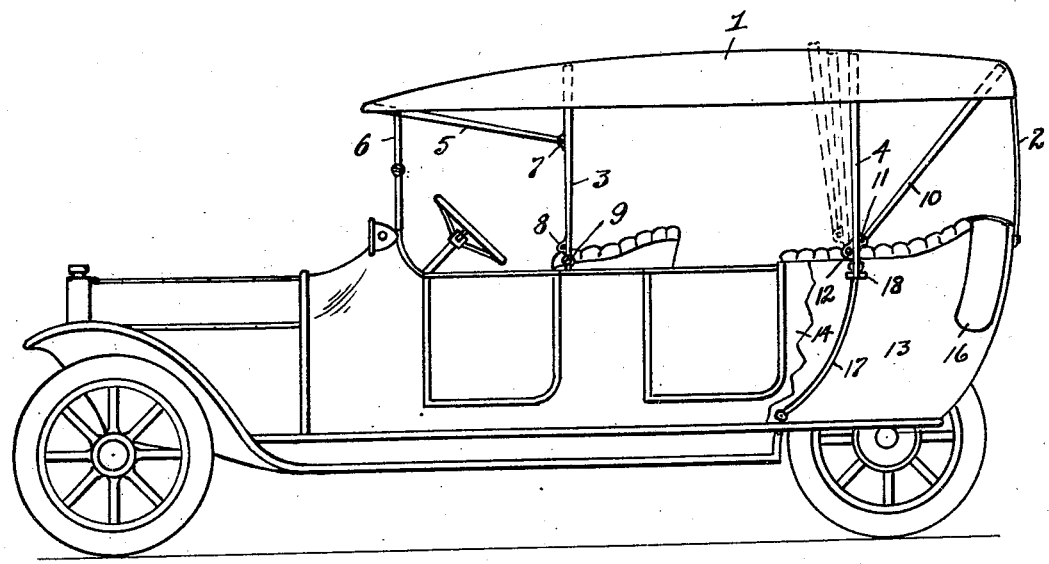
Figure 2:
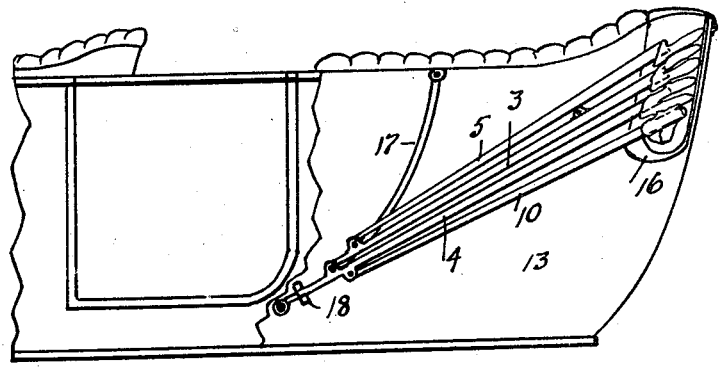

The invention in the preferred form of details will be described in the following specification, reference being had particularly to the accompanying drawings, in which:

Figure 1 is a view in elevation showing an automobile with the top in extended relation and shown partly folded in dotted outline. Fig. 2 is an enlarged broken elevation showing the top completely housed in the body. Fig. 3 is a broken plan illustrating particularly the receiving chamber for the top. Fig. 4 is a similar view illustrating the cover. Fig. 5 is a detail showing means for normally maintaining the cover in elevated position. Fig. 6 is a broken perspective of the main bow.

In carrying out the present improvement I contemplate that the top proper aside from the specific details hereinafter noted may be of any appropriate design or form, and that while the following description is more or less specific for convenience no limitations with respect to the top form is intended thereby.

In the present invention I have shown the top as comprising the usual cover portion 1, and rear curtain 2, the cover portion being supported on a forward bow 3 and a rear or main bow 4. The extreme forward end of the cover portion is directly connected to a brace bow 5 which near its forward end is removably connected or supported with relation to the wind shield 6, the rear end of the brace bow being removably secured in ears 7 carried by the forward bow 3, through which connection the bow 5 is in bracing position, the rear end of said brace bow being adapted to be seated in ears 8 near the lower end of the forward bow 3 when it is desired to fold the top. The forward bow 3 is formed at its lower end with means 9 whereby it may be removably connected to the body in proper position, that is adjacent the forward seat of the vehicle. The main bow 4 is provided with a diagonal brace bow 10 reaching from the lower end of the main bow to the extreme rear end of the cover 1, the lower end of the brace bow 10 being pivotally connected at 11 to the main bow to permit relative folding movement. The main bow is also provided adjacent the connection 11 with a bracket 12 forming ears in which the connecting members of the forward bow 3 may be placed and temporarily retained when the sections are in folded relation.

The rear portion of the tonneau particularly that following the outline of the rear seat is formed of spaced walls 13 and 14 so as to provide a chamber 15 between them. On the sides the space or chamber 15 thus formed for the reception of the top is coextensive with the height of the body while throughout the rear portion or length of the seat the chamber thus formed is but a portion of the height of the body, as clearly shown at 16, Fig. 2. Guide strips 17 are secured on the relatively inner walls 13 of the receiving space or chamber, said guide strips curving downwardly and forwardly, with their upper ends adjacent the upper edge of the wall, and their lower ends spaced from the bottom of the chamber. The guide strips are spaced practically throughout their full lengths from the wall and the lower ends of the main bow 4 are each provided with an extension having a lateral eye 18 which slidably embraces the guide strips 17.

The main bow when in extended cover supporting position has the eyes 18 arranged at the upper ends of the guide rods 17 and to support the parts in such position I provide each wall 13 immediately adjacent and beneath the guide strips 17 with spring plates 19 having connected pull rods 20 extending inwardly so as to be reached conveniently from the rear seat. The spring plates normally bow outwardly so as to underlie the eyes 18 and thereby support the bow, operation of the pull rods 20 withdrawing the spring plates to permit gravital descent of the parts.

With the parts arranged as shown in Fig. 1 in full lines, the top is extended. When it is desired to fold the same the forward bow 3 is released from the connection 9, the brace bow 5 released from its forward connection and the said forward bow and brace bow carried rearwardly and the lower ends of the forward bow connected in the ears 12. The rear ends of the brace bow 5 are disconnected from the ears 7 and moved downwardly and connected with the ears 8 thus folding the brace bow 5 against the forward bow. The pull rods 20 are operated and the main bow released so that the main bow with all connected parts gravitated within the chamber 15, the lower end of the main bow following the guide rods 17. The cover proper which of course has folded between the bows is during this movement of the bows housed in the rear portion 16 of the chamber, as clearly shown in Fig. 2.
Preferably the upper edge of the walls 13 and 14 are provided at appropriate intervals with members 21 of suitable fastening elements, the coöperating members 22 of which are carried upon the cover strip 23 which is thus secured to bridge the space between and cover the walls thus effectively concealing the top when in lowered position. The forward edge of the cover strip 23 is recessed at 24 to permit the passage therethrough of the lower portion of the main bow 4, so that after the top is extended the cover strip may be applied to conceal the chamber, as will be obvious.

From the above description it will be apparent that I have provided a top and coöperating chamber with the parts so coördinating that in folded relation the top will entirely disappear within and be concealed in said chamber, the arrangement being such however that the top is as readily accessible for extension from said chamber as from its usual folded position in rear of the body.

What is claimed is:

1. A vehicle having a body formed in part of spaced walls to provide a receiving chamber, the rear portion of said chamber being of less depth than the front portion, a vehicle top including a cover and supporting bows, guide rods arranged in the front portion of said receiving chamber, means for slidably connecting the bows to said guide rods, the lower ends of the guide rods terminating adjacent the bottom of the front portion of the receiving chamber, the rear portion of said chamber receiving the cover and connected parts of the bows, whereby the bows are held within the receiving chamber at a downward and forward inclination.

2. A vehicle having a body formed in part of spaced walls to provide a receiving chamber, a vehicle top including a cover and supporting bows, the cover receiving portion of the chamber being of less depth than the remaining portion, and guide rods arranged in the chamber in advance of the cover receiving portion thereof, said bows being slidably connected to the guide rods, the guide rods curving downwardly and forwardly and terminating at a point materially below the cover receiving portion of the chamber to maintain the bows at a forward and downward inclination.

3. A vehicle having a body formed in part of spaced walls to provide a receiving chamber, a vehicle top including a cover and supporting bows, the cover receiving portion of the chamber being of less depth than the remaining portion, and guide rods arranged in the chamber in advance of the cover receiving portion thereof, said bows being slidably connected to the guide rods, the guide rods curving downwardly and forwardly and terminating at a point materially below the cover receiving portion of the chamber to maintain the bows at a forward and downward inclination, the minimum distance between the guide rods and cover receiving portion of the chamber being less than the maximum length of the bows.

In testimony whereof I affix my signature in presence of two witnesses.

JOHN E. TABER.

Witnesses:
GEORGE A. KURTZ,
GEORGE J. OLTSCH.